United States Patent
Merrill

[15] 3,683,626

[45] Aug. 15, 1972

[54] EXHAUST PURIFICATION

[72] Inventor: Edward W. Merrill, Cambridge, Mass.

[73] Assignee: Hans H. Estin, Leonard W. Cronkhite, Jr. and William W. Wolbach, trustees of the Charles River Foundation

[22] Filed: Dec. 14, 1970

[21] Appl. No.: 97,913

[52] U.S. Cl. ............... 60/279, 55/DIG. 30, 55/84, 55/228, 55/233, 55/257, 55/387, 60/310
[51] Int. Cl. .................... F01n 3/04, F02b 75/10
[58] Field of Search......... 60/30 R, 30 L, 32, 31, 279, 60/310; 55/DIG. 30, 84, 85, 92, 220, 222, 228, 233, 257, 277, 387

[56] References Cited

UNITED STATES PATENTS

| 1,388,480 | 8/1921 | Paris | 60/30 L |
| 2,115,228 | 4/1938 | Lundquist | 60/29 F |
| 2,185,584 | 1/1940 | Boyce | 60/29 F |
| 2,579,282 | 12/1957 | Vicard | 55/257 |
| 2,663,382 | 12/1953 | Dautrebande | 55/84 |
| 3,044,235 | 7/1962 | Schneider | 55/84 |
| 3,353,336 | 11/1967 | Caballero | 55/228 |
| 3,383,854 | 5/1968 | White | 60/29 F |
| 3,495,384 | 2/1970 | Alliger | 55/233 |

Primary Examiner—Douglas Hart
Attorney—Kenway, Jenney & Hildreth

[57] ABSTRACT

Exhaust gas from an internal combustion engine at super atmospheric pressure is cooled to its dew point at that pressure then is admixed with an aqueous aerosol comprising particles of water coated with an oleophilic surfactant and having an average particle size between 0.5 and 5 microns. The resultant mixture is expanded to reduce gas pressure to nearly atmospheric and reduce the temperature thereby condensing a significant fraction of water vapor in the initial exhaust mixture on the aerosolized particles. The resulting particles, have a size which permits their removal by centrifugation or equivalent means. The method is particularly effective in removing particulate matter and hydrocarbons in exhaust and can be used alone or in conjunction with means for removing nitrogen oxides.

11 Claims, 3 Drawing Figures

Patented Aug. 15, 1972

INVENTOR
EDWARD W. MERRILL

BY Hemenway, Jenney & Hildreth

ATTORNEYS

INVENTOR
EDWARD W. MERRILL

EXHAUST PURIFICATION

This invention relates to a process and apparatus for removing pollutants from internal combustion engine exhaust gases.

The pollutants in exhaust from internal combustion engines may be classified in the following broad categories: hydrocarbons, nitrogen oxides, carbon monoxide and particulate matter. Present methods of emission control aim principally at reducing hydrocarbons and carbon monoxide in the exhaust gas, by introducing secondary air into the exhaust after the engine, and using various devices including catalytic surfaces to complete oxidation of the hydrocarbons and of the carbon monoxide to the ultimate products of combustion, namely carbon dioxide and water. These convertors or emission control units have substantially no effect on the particulate emission, nor on the nitrogen oxide emission. As is well known, the higher the temperature of combustion the greater is the tendency to form nitrogen oxides from molecular nitrogen and oxygen in the air entering the engine. High temperatures also favor the dissociation equilibrium of carbon dioxide to carbon monoxide.

From the viewpoint of public health it is likely that particulate matter represents a special hazard because these particles easily can become or form Aitken nuclei which adsorb on themselves various toxic substances and which are very easily inspired through the respiratory tract into the alveolar part of the lungs. These nuclei also are a principle factor in the evolution of smog. Particulate matter also contains lead residues from lead gasoline and known carcinogens such as benz [α]pyrene.

The hydrocarbons emitted with the exhaust from internal combustion engines include raw fuel components such as heptane, octane and kerosene fractions or partially oxidized molecular species such as aldehydes including acrolein. Some of the hydrocarbons species, especially, the olefins and other unsaturates are especially prone to interact with nitrogen oxides in the presence of ultraviolet radiation (sun) to form smog. Aside from the probable toxicity of smog particles inspired by the living human, there is good reason to conclude that the original hydrocarbon vapor molecules found in automobile exhaust may, if captured by the alveolar surface of the lung, cause temporary or irreversible long term damage.

It would be highly desirable to provide means for drastically reducing the particulate matter of exhaust from internal combustion engines, before the exhaust is discharged finally into the atmosphere. Furthermore, it would be desirable to reduce particulate matter in exhaust while reducing hydrocarbon and nitrogen oxides in the exhaust.

The present invention provides a process and apparatus for removing particulate matter from internal combustion engine exhaust by adding to the exhaust gas aerosolized particles that bind the particulate matter upon collision and removing the resultant particles. The exhaust gas first is cooled so that it is substantially saturated with water formed during combustion. The cooled gas is admixed with an aqueous aerosol of water particles having an oleophilic surface of e.g., lecithin which serves as nuclei which absorb contaminants in the exhaust gas. The resultant gas-particle mixture is cooled to condense a portion of the water vapor thereby increasing the average size of the particles therein. The particles then are separated from the exhaust gas by any convenient means such as by centrifugation or filtration. The bulk liquid phase resulting from collection of particles may be recycled in whole or in part by reinjection into the engine.

Suitable aqueous aerosols are described in applicant's copending application Ser. No. 856,765 filed Sept. 10, 1969. In general these are formed by aerosolizing an aqueous solution of a surfactant having an oleophilic moiety. The oleophilic surfactant forms a coating on the aerosolized aqueous particles that become nuclei for condensation of additional quantities of water. Furthermore, the surfactant coating serves to absorb hydrocarbons from surrounding exhaust and to wet particulate matter upon collision of such matter with the aerosolized particles to bind the particulate matter. A further function of the surfactant at a subsequent stage is to emulsify high molecular weight hydrocarbons in water to remove them from the exhaust gas. Thus, the use of the surfactant controls the particle size of the aerosol and permits the aerosolized material and the condensate formed thereon to collect large quantities of hydrocarbon and particulate matter that otherwise could not be retained.

The exhaust gas can be subjected to the process described above either alone or in conjunction with other treating means to remove other noxious components from exhaust gas. In a preferred embodiment of this invention all or a substantial part of the liquid recovered from the separator is recycled into the internal combustion engine. In consequence three beneficial results are achieved: (1) the peak temperature is significantly reduced on account of vaporization of water thereby significantly reducing the production of nitrogen oxides; (2) combustion of the primary fuel is improved because of the well-know effects of addition of water from any source on such combustion; and, finally (3) the hydrocarbon and particulate content of the condensate received from the separator, as well as the surfactant, is consumed by combustion. If the particulate matter consists substantially entirely of matter formed by the thermal cracking of the primary fuel, it is desirable to recycle all of the condensate from the separator. If, on the other hand, a lead-containing fuel is used it will generally be desirable to recycle a part of the condensate to the engine, while collecting another portion for subsequent discard into appropriate waste reservoirs.

In another aspect of this invention, the exhaust gas is contacted with cool, wet calcium carbonate or its equivalent to convert the nitrogen oxides in the gas to nitrates with evolution of innocuous carbon dioxide. In another aspect of this invention, the hot exhaust gas can be treated with conventional catalytic oxidation means to convert hydrocarbons and carbon monoxide to carbon dioxide.

The invention can be more fully described with reference to the attached figures.

Figure 1:
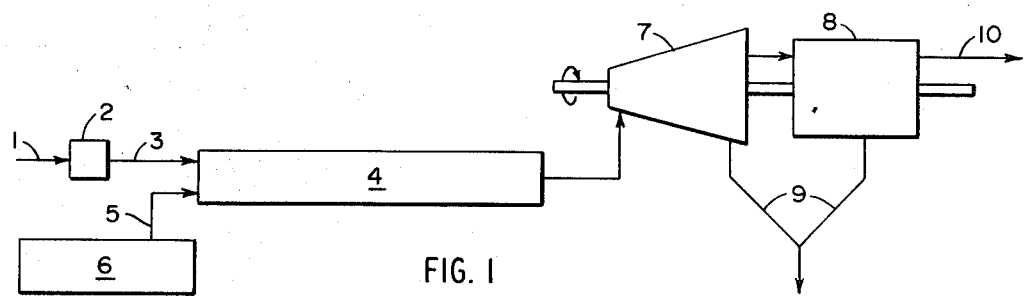
FIG. 1 is a schematic diagram showing one embodiment of this invention.

Referring to FIG. 1, the exhaust in conduit 1 from an internal combustion engine, is cooled at superatmospheric pressure of about 1.5 atmospheres in cooling zone 2 to its saturation temperature but without condensation of water. The cooled gas is passed through conduit 3 into a chamber 4 concomitantly with an aerosol introduced through conduit 5 generated with any conventional means such as an ultrasonic generator 6. The rate of generation of aerosol in relationship to the exhaust is such as to supply approximately $10^6$ nucleating particles per cc of exhaust, a figure comparable in magnitude (within one decade) to the number of particulate nuclei in the engine exhaust. In chamber 4, which may have various forms including a trombone pipe arrangement, the particulate matter, by diffusion, collides with the aerosol particles during the residence time available so that a very substantial fraction of the particulate matter is bound to the larger aerosol particles. Simultaneously, the aerosol particles absorb molecular hydrocarbon vapor of all types from the surrounding gas phase. The mixture is condensed on the aerosol nuclei already present resulting in a significant increase in their diameter. As the particles pass through the expansion turbine 7 into the gas centrifuge 8 they have sufficient diameter to be removed by progression to the wall under centrifugal forces from which they are removed as a liquid emulsion through conduits 9. The exhaust leaving the centrifuge 8 through conduit 10 to the atmosphere has been unburdened of most of its particulate matter, and a very substantial fraction of its hydrocarbon content other than in the form of a particulate matter.

Figure 2:
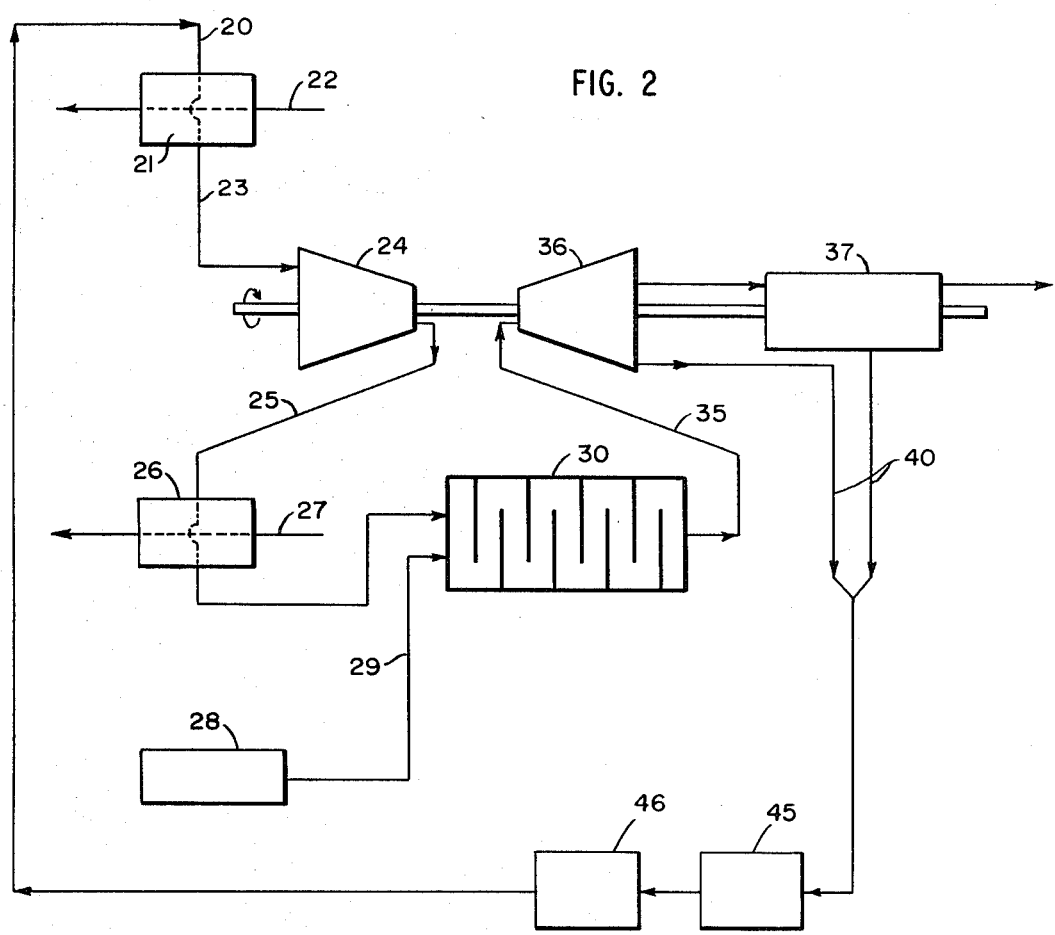
FIG. 2 is a schematic diagram showing a further embodiment.

FIG. 2 shows an embodiment of the invention in which gas compression and expansion zones are employed, and total recycle of the condensed liquid to the engine is effected. Nitrogen oxide production is significantly reduced on account of the water in the condensed liquid; combustion is improved, and the hydrocarbon and particulate content of the condensate is mostly converted to carbon dioxide and water with consumption of less than 5 horsepower.

Exhaust from an internal combustion engine typically at a pressure of about one atmosphere and a temperature of about 1,000° F. is passed through conduit 20 into indirect heat exchanger 21 in heat exchange relationship with cooling air entering through conduit 22 to reduce the gas temperature to about 250° F. The cooled exhaust gas is passed through conduit 23 into a compressor 24 from which it issues through conduit 25 at superatmospheric pressure of about 1.5 atmospheres, and at a temperature of about 340° F. It passes directly into another indirect heat exchanger 26 into heat exchange relationship with air through conduit 27 to reduce its temperature to the dew point of about 135° F. at 1.5 atmospheres.

The dew point will be progressively increased from approximately 135° F depending upon the extent of recycle of condensed water, in a manner to be described. An aerosol comprising water particles coated with an oleophilic surfactant is formed in chamber 28, passed through conduit 29, and admixed with the exhaust in a baffled chamber 30, the purpose of the baffles being to define a long path so as to provide adequate residence time of the aerosolized particles and the exahust. The stream 35 leaving the chamber 30 comprises a mixture of exhaust gas and the aerosolized particles which pass into an expansion turbine 36 or its equivalent (Venturi) to expand the gas to, e.g., atmospheric pressure and reduce its temperature to, e.g., 90° F thereby causing condensation of water vapor in the exhaust gas.

The mixture is then passed through separator 37, preferably a gas centrifuge, to deposit the water droplets nucleated upon the aerosol particles and thereby produce a bulk liquid emulsion containing water, hydrocarbon, particulate matter, and the surfactant. The liquid streams 40 are withdrawn from turbine 36 and separator 37, combined, and recycled back to the engine 46. They may be injected into the fuel intake 45 of the engine 46 by injectors, or by aspiration in a conventional carburetor. It will be understood that in consequence of this recycle the water part of the recycle serves significantly to reduce nitrogen oxide production because it lowers the peak temperature during the combustion cycle significantly.

Furthermore, it is well recognized and documented that the injection of water actually improves combustion because of participation of the water molecule in the oxidation of the hydrocarbon fuel. Power output is improved and carbon monoxide production is reduced. The hydrocarbon part of the recycled condensate and the particulate matter, as well as the surfactant are nearly completely oxidized during the reaction in the combustion chamber of the engine. Fragments that survive the combustion are captured in the exhaust gas by the process just outlined.

The process of FIG. 2 is particularly suitable for fuels not containing significant quantities of tetraethyl lead. It will be understood that, alternatively, a fraction of the condensate 40 may be withdrawn and stored for ultimate safe disposal, the remainder being recycled to the engine.

Figure 3:
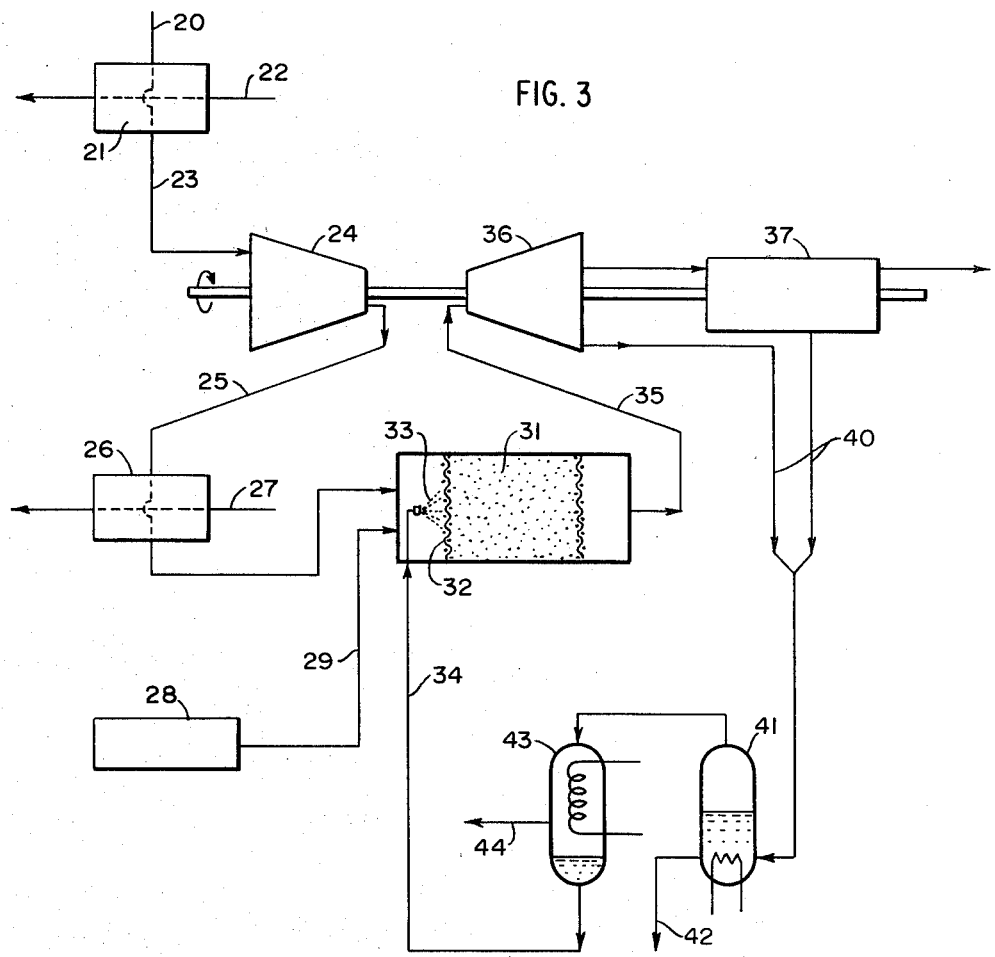
FIG. 3 illustrates a process in which hot exhaust is passed through a complete system from which volatile hydrocarbons are recycled to the motor, exhaust is purified and released to the atmosphere, and a nitrate solution is removed as a consequence of absorption of nitrogen oxides.

FIG. 3 shows an embodiment of the invention in which gas compression and expansion zones are employed, a significant amount of hydrocarbons captured from the exhaust are recovered and recycled to the engine, and in which nitrogen oxides in the exhaust are partially removed by adsorption on a mineral carbonate. As in FIG. 2, so likewise in FIG. 3, exhaust from an internal combustion engine, typically at a pressure of about 1 atm. and a temperature of about 1,000° F, is passed through conduit 20 into indirect heat exchanger 21 in heat exchange relationship with cooling air entering through conduit 22 to reduce the gas temperature to about 250° F. The cooled exhaust gas is passed through conduit 23 into a compressor 24 from which it issues through conduit 25 at superatmospheric pressure of about 1.5 atm. and at a temperature of about 350° F. It passes directly into another indirect heat exchanger 26 in heat exchange relationship with air through conduit 27 to reduce its temperature to the dew point of about 135° F at 1.5 atm.

An aerosol comprising water particles coated with an oleophilic surfactant is formed in chamber 28, for example, ultrasonically; passed through conduit 29 and admixed with the exhaust prior to its entry into the packed section 31 of absorber 32. The aerosol particles have a sufficiently small diameter, less than about 5 microns, so that only an insignificant portion is entrained upon the carbonate granules. The absorbent preferably is in the form of granulated calcium carbonate, dolomite or other relatively insoluble mineral carbonate. A cool aqueous spray 33 much coarser than the aerosol particles, may be introduced into chamber 32 through conduit 34 to wet the carbonate granules.

The stream 3 leaving chamber 32 comprises a mixture of exhaust gas and the aerosolized particles which pass into an expansion turbine 36 or its equivalent (Venturi) to expand the gas to e.g., atmospheric pressure and reduce its temperature to e.g., 90° F. thereby causing condensation of water vapor in the exhaust gas. The mixture then is passed into a separator 37, preferably a gas centrifuge to deposit the water droplets nucleated upon the aerosol particles.

Liquid streams 40 are withdrawn from turbine 36 and separator 37. These are the residues of the aerosol particles upon which condensation of water vapor from the exhaust gas was induced by its expansion. This liquid contains a wide range of hydrocarbons as well as the particulate matter from the exhaust. To remove the volatile hydrocarbons from the liquid, it is passed through a small still 41, which may use waste heat from the engine e.g., exhaust, hot cooling water, or an auxiliary resistance electrical heater, to distill off the hydrocarbons and leave a liquid residue 42, collected for ultimate discarding, containing most of the particulate matter and the higher non-volatile hydrocarbons. The mixed volatile hydrocarbon and steam passing from the still 4 enters a partial condenser 43 from which a residual hydrocarbon rich vapor 44 is removed and recycled to the engine along with some water vapor. The condensate from condenser 43 is recycled to the entry end of absorber 32 to wet the mineral carbonate and facilitate the absorption of nitrogen oxides thereon.

It will be understood that the purpose of the expansion turbine or venturi meter is to provide rapid decrease in temperature and condensation of water vapor in order that the aerosol nuclei may grow quickly. A further object is to derive some mechanical power from rotation in the turbine or from kinetic energy of the effluent stream in the case of a venturi meter in order to facilitate operation of the gas centrifuge. It will be understood that in place of the gas centrifuge in the form of a rotating cylinder operating at a high rotational speed (cir.6,000 rmp), suitable fibrous filter material may be used provided appropriate allowance is made for the pressure drop through it. It will also be understood that, in reference to FIG. 2, compressor 24 expansion turbine 36 and centrifuge 37 may be an integral machine operated on a common rotor with appropriate interconnections of the inlet and outlet streams. Also, it will be understood that in the absorber, granulated mineral carbonate may be replaced by fixed surfaces or walls over which a carbonate containing water spray is poured so as to form a slightly alkaline absorption medium, with the absorbent liquid in place of one consisting of finely ground calcium carbonate maintained in the colloidal dispersion.

While particular reference has been made to gasoline internal combustion engines, the methods of this invention are equally applicable to diesel engines from which the particulate emission is often more severe by orders of magnitude than from gasoline engines and from which there is a significant greater emission of nitrogen oxides.

Suitable oleophilic surfactants that can be employed herein are the lecithins referred to in copending application Ser. No. 856,765 filed Sept. 10, 1969, and others having oleophilic surface forming characteristics.

Suitable carbonate absorbents are those that are slightly water-soluble and react with nitrogen oxides to form nitrates with evolution of carbon dioxide. Suitable carbonates include calcium carbonate, dolomite, and the like. The carbonate is employed in amounts sufficient to convert the nitrogen oxide in the exhaust without requiring frequent replacement of carbonates.

For a typical internal combustion engine in an automobile having a 20 gallon fuel capacity and assuming about 300 minutes operation at 60 mph., nitrogen oxide production is about 1.75 to 2.2 grams per minute and about $10^6$ particles per cc exhaust. To purify this exhaust from about 1 to 8 pints of 2 percent aqueous solution lecithin will be required. Optionally 0.1 to 1 pounds calcium carbonate will be required in addition, according to one embodiment of this invention.

The following example illustrates the present invention and is not intended to limit the same.

EXAMPLE I

A gasoline powered, 250 cubic inch engine with an air-fuel ratio of 13 to 1 consumes fuel at the rate of 250 cc per minute in the form of premium gasoline and produces an exhaust of about 2,500 grams per minute including water. The exhaust from the engine is passed through an air to air compact heat exchanger whereby its temperature is reduced to 250° F. Suitable heat exchangers include the compact plate fin exchanger, code No. ⅝ – 11.1 shown in "Heat Transmission", 3rd edition, Chemical Engineering Series by McAdams, pages 286–290 or the direct transfer type shown in "-Compact Heat Exchangers" by Kays and London, 1958 edition, page 149, FIG. 120. The gas then enters a turbo-compressor having a normal rating of 3 horsepower at 6,000 rpm. It leaves a turbo-compressor at 15 inches of mercury pressure and a temperature of about 350° F. from which it is passed into a second compact heat exchanger sufficient to lower its temperature to its dew point which is 135° F. (at which temperature the vapor pressure of water is 137 mm. of mercury). A 2 weight per cent dispersion dipalmitoyl lecithin in pure water is aerosolized by means of an ultrasonic transducing element, into the exhaust stream leaving the compact heat exchanger at the rate of 1 cc of liquid per minute. Inasmuch as the mean particle diameter is one micron, approximately $3.3 \times 10^{10}$ particles per cc are being injected into the exhaust stream. The exhaust stream at a pressure of 1.5 atmospheres (15 inches of mercury gauge pressure) and at a temperature of 135° F. is flowing at the rate of 27,400 cc per second and thus, on the average, each cubic centimeter of exhaust stream receives about one million particles of nucleating aerosol. They provide a surface area of about 0.04 square centimeters per cubic centimeter of gas volume and the mean distance between them is approximately 100 microns, center to center distance. The mixture of aerosol and exhaust gas passes through a baffled chamber into an expansion turbine wherein the temperature decreases to approximately 120° F. Approximately 5 percent of the total water vapor in the exhaust mixture is condensed on the aerosolized nuclei making a total condensate stream of approximately 12 cc per second. The water droplets nucleated by the aerosol particles are removed by means of a centrifugal gas centrifuge having an outside diameter of 10 cm with internal vanes spaced at 15° intervals operating at 6,000 rpm, although a portion of the water is removed in the expansion turbine. The effluent liquid from the gas centrifuge and from the turbine is recycled and injected into the air stream passing into the carburetor of the engine.

EXAMPLE II

As will be seen from FIG. 3, the exhaust treatment system is the same as described in Example I with the exception that the exhaust and aerosol are passed through a bed of carbonate, and the liquid collected from the expansion turbine and separator is passed through a heat exchanger serving as a partial still, so that per 10 cc of entering liquid approximately half is vaporized, the rest being taken off as waste. The mixed vapor leaving the still is passed through a partial condense 43, wherein approximately two-thirds is condensed and cooled to approximately 140° F. prior to reinjection into the absorbing section where it serves to wet the contained granular carbonate. The remaining vapor is recycled to the air inlet of the carburetor on the engine. The liquid residue withdrawn from the partial still contains the particulate matter and relatively non-volatile hydrocarbons, as well as a small content of nitrate. The liquid removed from the absorber consists primarily of calcium nitrate and calcium nitrate. Depending upon whether or not this liquid contains significant quantities of hydrocarbon, it may, with relative safety be discarded. Alternatively, it may be directed to a separate processing facility to retrieve its nitrate content for uses as an agricultural fertilizer.

This invention has been described with specific reference to what is presently contemplated as its preferred embodiment. It is expected that modification will readily occur to those skilled in the art and familiar with the principles herein set forth, and that such may be made without departing from the scope of this invention.

Having thus disclosed my invention I claim and desire to secure by Letters Patent:

1. A process for removing solid particles and hydrocarbons from engine exhaust gas which comprises cooling hot engine exhaust gas, to saturation, adding an aerosol comprising water particles having an oleophilic surfactant surface to the cool exhaust gas, expanding the exhaust gas to reduce its temperature and cause condensation effective to enlarge said aerosol particles, and removing the enlarged aerosol particles and entrapped solid particles from said gas.

2. The process of claim 1 wherein a substantial fraction of the recovered liquid and entrapped solid particles is recycled into an engine producing said engine exhaust gas.

3. The process of claim 1 wherein the exhaust gas is expanded adiabatically.

4. The process of claim 1 wherein the condensed aerosol particles removed from the exhaust gas are collected and heated to evaporate hydrocarbons adsorbed from said exhaust gas and the evaporated hydrocarbons are returned to an engine producing said engine exhaust gas.

5. The process of claim 1 wherein the exhaust gas is contacted with calcium carbonate to remove nitrogen oxides in said gas.

6. Apparatus for removing solid particles and hydrocarbons from engine exhaust gas which comprises in combination, means for cooling exhaust gas to substantial water saturation at superatmospheric pressure, means for forming an aerosol of water particles having an oleophilic surfactant surface, means for mixing said aerosol and cool gas, means for expanding said mixture adiabatically and means for separating particles from said gas.

7. The apparatus of claim 6 wherein said cooling means comprises two air-gas heat exchangers and a gas compressor wherein said hot exhaust gas passes through a first heat exchanger, the compressor and then through a second heat exchanger.

8. The apparatus of claim 6 wherein the means for expanding the cool gas comprises a gas turbine.

9. The apparatus of claim 6 wherein the means for separating said aerosol particles comprises a gas centrifuge.

10. The apparatus of claim 6 wherein a bed of carbonate is interposed between said cooling means and said expansion means to convert nitrogen oxides in said exhaust gas to carbon dioxide and nitrates.

11. The apparatus of claim 6 wherein means are provided to collect the particles from the gas and return them to a fuel intake of an engine producing said engine exhaust gas.

* * * * *

UNITED STATES PATENT OFFICE
CERTIFICATE OF CORRECTION

Patent No. 3,683,626     Dated August 15, 1972

Inventor(s) Edward W. Merrill

It is certified that error appears in the above-identified patent and that said Letters Patent are hereby corrected as shown below:

Column 8, line 19, "adsorbed" should read -- absorbed --.

Signed and sealed this 6th day of February 1973.

(SEAL)
Attest:

EDWARD M. FLETCHER, JR.
Attesting Officer

ROBERT GOTTSCHALK
Commissioner of Patents